US009401858B2

(12) United States Patent
Francois et al.

(10) Patent No.: US 9,401,858 B2
(45) Date of Patent: Jul. 26, 2016

(54) LOOP AVOIDANCE DURING NETWORK CONVERGENCE IN SWITCHED NETWORKS

(71) Applicant: Cisco Technology, Inc., San Jose, CA (US)

(72) Inventors: Pierre Jean Rene Francois, Madrid (ES); Clarence Filsfils, Brussels (BE); Stefano B. Previdi, Rome (IT); Stewart F. Bryant, Redhill (GB); Ian Michael Charles Shand, Cobham (GB)

(73) Assignee: Cisco Technology, Inc., San Jose, CA (US)

( * ) Notice: Subject to any disclaimer, the term of this patent is extended or adjusted under 35 U.S.C. 154(b) by 157 days.

(21) Appl. No.: 14/319,353

(22) Filed: Jun. 30, 2014

(65) Prior Publication Data
US 2015/0381406 A1 Dec. 31, 2015

(51) Int. Cl.
*H04L 12/28* (2006.01)
*H04L 12/703* (2013.01)
*H04L 12/751* (2013.01)
*H04L 12/24* (2006.01)

(52) U.S. Cl.
CPC ............... *H04L 45/28* (2013.01); *H04L 12/24* (2013.01); *H04L 45/02* (2013.01); *H04L 41/0654* (2013.01)

(58) Field of Classification Search
CPC ...................................................... H04L 12/24
USPC .................................................. 370/216–218
See application file for complete search history.

(56) References Cited

U.S. PATENT DOCUMENTS

| 6,032,197 | A | 2/2000 | Birtwell ......................... 709/216 |
| 6,374,303 | B1 | 4/2002 | Armitage et al. ............. 709/242 |
| 6,577,600 | B1 * | 6/2003 | Bare ................. H04M 15/8016 370/238 |
| 6,647,428 | B1 | 11/2003 | Bannai et al. ................. 709/245 |
| 6,963,570 | B1 | 11/2005 | Agarwal .................... 370/310.2 |
| 7,023,846 | B1 | 4/2006 | Andersson et al. ........... 370/389 |
| 7,031,253 | B1 | 4/2006 | Katukam et al. .............. 370/222 |
| 7,031,607 | B1 | 4/2006 | Aswood Smith ............... 398/51 |
| 7,061,921 | B1 | 6/2006 | Sheth ....................... 370/395.52 |
| 7,068,654 | B1 | 6/2006 | Joseph et al. ................ 370/392 |
| 7,072,346 | B2 | 7/2006 | Hama ...................... 370/395.53 |

(Continued)

OTHER PUBLICATIONS

Aggarwal, R. and Y. Rekhter, Juniper Networks; E. Rosen, Cisco Systems, Inc.; "MPLA Upstream Label Assignment and Context Specific Label Space;" Network Working Group; Internet Draft; Jan. 2005; pp. 1-8.

(Continued)

*Primary Examiner* — Farah Faroul
(74) *Attorney, Agent, or Firm* — Campbell Stephenson LLP

(57) ABSTRACT

Various techniques can be used to avoid loops during network convergence after a topology change such as a failure. For example, a method can involve detecting a failure that disrupts an existing forwarding path between a node and a destination node; calculating at least one updated forwarding path from the node to the destination node; identifying a maximum time for at least a portion of the network to reach a post-convergence state with respect to the failure; until the maximum time has elapsed at the node, explicitly specifying at least a portion of the updated forwarding path in packet headers of any packets being sent from the node to the destination node; and after the maximum time has elapsed at the node, non-explicitly specifying the portion of the updated forwarding path in packet headers of any additional packets being sent from the node to the destination node.

20 Claims, 6 Drawing Sheets

(56) References Cited

U.S. PATENT DOCUMENTS

| | | | |
|---|---|---|---|
| 7,088,721 B1 | 8/2006 | Droz et al. | 370/395.1 |
| 7,154,416 B1 | 12/2006 | Savage | 341/51 |
| 7,174,387 B1 | 2/2007 | Shand et al. | 709/238 |
| 7,180,887 B1 | 2/2007 | Schwaderer | 370/351 |
| 7,260,097 B2 | 8/2007 | Casey | 370/392 |
| 7,286,479 B2 | 10/2007 | Bragg | 370/225 |
| 7,330,440 B1* | 2/2008 | Bryant | H04L 45/00 370/254 |
| 7,359,377 B1 | 4/2008 | Kompella et al. | 370/389 |
| 7,420,992 B1 | 9/2008 | Fang | 370/477 |
| 7,430,210 B2 | 9/2008 | Havala et al. | 370/395.53 |
| 7,463,639 B1 | 12/2008 | Rekhter | 370/409 |
| 7,466,661 B1 | 12/2008 | Previdi et al. | 370/254 |
| 7,471,669 B1 | 12/2008 | Sabesan | 370/351 |
| 7,564,803 B1 | 7/2009 | Minei et al. | 370/254 |
| 7,577,143 B1 | 8/2009 | Kompella | 370/392 |
| 7,602,778 B2 | 10/2009 | Guichard et al. | 370/389 |
| 7,610,330 B1 | 10/2009 | Quinn | 709/201 |
| 7,773,630 B2 | 8/2010 | Huang et al. | 370/474 |
| 7,817,667 B2 | 10/2010 | Frederiksen et al. | 370/474 |
| 7,885,259 B2 | 2/2011 | Filsfils | 370/389 |
| 7,885,294 B2 | 2/2011 | Patel | 370/202 |
| 7,894,352 B2 | 2/2011 | Kompella et al. | 370/248 |
| 7,894,458 B2 | 2/2011 | Jiang | 370/401 |
| 7,940,695 B1 | 5/2011 | Bahadur | 370/254 |
| 7,983,174 B1 | 7/2011 | Monaghan | 370/242 |
| 8,064,441 B2 | 11/2011 | Wijnands et al. | 370/389 |
| 8,339,973 B1 | 12/2012 | Pichumani | 370/248 |
| 8,422,514 B1 | 4/2013 | Kothari et al. | 370/466 |
| 8,542,706 B2 | 9/2013 | Wang et al. | 370/474 |
| 8,630,167 B2 | 1/2014 | Ashwood Smith | 370/255 |
| 8,711,883 B2 | 4/2014 | Kang | 370/389 |
| 8,792,384 B2 | 7/2014 | Banerjee et al. | 370/254 |
| 8,953,590 B1 | 2/2015 | Aggarwal | 370/389 |
| 9,036,474 B2 | 5/2015 | Dibirdi et al. | 370/235 |
| 9,112,734 B2 | 8/2015 | Edwards et al. | |
| 9,118,572 B2 | 8/2015 | Sajassi | |
| 2001/0037401 A1 | 11/2001 | Soumiya | 709/232 |
| 2002/0103732 A1 | 8/2002 | Bundy et al. | 705/35 |
| 2003/0016678 A1 | 1/2003 | Maeno | 370/400 |
| 2003/0026271 A1 | 2/2003 | Erb et al. | 370/401 |
| 2003/0126272 A1 | 7/2003 | Corl, Jr. et al. | 709/230 |
| 2003/0142674 A1 | 7/2003 | Casey | 370/393 |
| 2003/0231634 A1 | 12/2003 | Henderson | 370/395.32 |
| 2004/0160958 A1 | 8/2004 | Oh | 370/395.1 |
| 2004/0174879 A1 | 9/2004 | Basso et al. | 370/392 |
| 2004/0196840 A1 | 10/2004 | Amrutur et al. | 370/389 |
| 2005/0213513 A1 | 9/2005 | Ngo | 370/254 |
| 2005/0259655 A1 | 11/2005 | Cuervo et al. | 370/392 |
| 2006/0002304 A1 | 1/2006 | Ashwood-Smith | 370/238 |
| 2006/0013209 A1 | 1/2006 | Somasundaram | 370/389 |
| 2006/0075134 A1 | 4/2006 | Aalto | 709/238 |
| 2006/0080421 A1 | 4/2006 | Hu | 709/223 |
| 2006/0092940 A1* | 5/2006 | Ansari | H04L 45/00 370/392 |
| 2006/0262735 A1 | 11/2006 | Guichard | 370/254 |
| 2006/0274716 A1 | 12/2006 | Oswal et al. | 370/349 |
| 2007/0019647 A1 | 1/2007 | Roy et al. | 370/392 |
| 2007/0053342 A1 | 3/2007 | Slereckl | 370/351 |
| 2007/0058638 A1 | 3/2007 | Guichard et al. | 370/395.31 |
| 2007/0189291 A1 | 8/2007 | Tian | 370/390 |
| 2008/0002699 A1 | 1/2008 | Rajsic | 370/392 |
| 2008/0075016 A1 | 3/2008 | Ashwood-Smith | 370/252 |
| 2008/0075117 A1* | 3/2008 | Tanaka | H04L 45/00 370/471 |
| 2008/0084881 A1 | 4/2008 | Dharwadkar et al. | 370/392 |
| 2008/0101227 A1 | 5/2008 | Fujita et al. | 370/232 |
| 2008/0101239 A1 | 5/2008 | Good | 370/235 |
| 2008/0172497 A1 | 7/2008 | Mohan et al. | 709/249 |
| 2008/0189393 A1 | 8/2008 | Wagner | 709/218 |
| 2008/0192762 A1 | 8/2008 | Kompella et al. | 370/395.53 |
| 2008/0225864 A1 | 9/2008 | Aissaoui et al. | 370/401 |
| 2008/0253367 A1 | 10/2008 | Ould-Brahim | 370/389 |
| 2008/0259820 A1 | 10/2008 | White et al. | 370/255 |
| 2009/0041038 A1 | 2/2009 | Martini et al. | 370/401 |
| 2009/0135815 A1 | 5/2009 | Pacella | 370/389 |
| 2010/0063983 A1 | 3/2010 | Groarke et al. | 707/803 |
| 2010/0088717 A1 | 4/2010 | Candelore | 725/32 |
| 2010/0124231 A1 | 5/2010 | Kompella | 370/40 |
| 2010/0142548 A1 | 6/2010 | Sheth | 370/410 |
| 2010/0220739 A1 | 9/2010 | Ishiguro | 370/401 |
| 2010/0232435 A1 | 9/2010 | Jabr et al. | 370/392 |
| 2010/0284309 A1 | 11/2010 | Allan et al. | 370/256 |
| 2011/0228780 A1 | 9/2011 | Ashwood-Smith | 370/392 |
| 2011/0268114 A1 | 11/2011 | Wijnands et al. | 370/389 |
| 2011/0280123 A1 | 11/2011 | Wijnands et al. | 370/228 |
| 2011/0286452 A1 | 11/2011 | Balus | 370/390 |
| 2012/0044944 A1 | 2/2012 | Kotha et al. | 370/401 |
| 2012/0069740 A1 | 3/2012 | Lu et al. | 370/238 |
| 2012/0069845 A1 | 3/2012 | Carnet et al. | 370/392 |
| 2012/0082034 A1 | 4/2012 | Vasseur | 370/235 |
| 2012/0120808 A1 | 5/2012 | Nandagopal et al. | 370/238 |
| 2012/0213225 A1 | 8/2012 | Subramanian et al. | 370/392 |
| 2012/0218884 A1 | 8/2012 | Kini | 370/228 |
| 2012/0307629 A1* | 12/2012 | Vasseur | H04L 45/34 370/228 |
| 2013/0003728 A1 | 1/2013 | Kwong et al. | 370/389 |
| 2013/0077476 A1 | 3/2013 | Enyedi | 370/225 |
| 2013/0077626 A1 | 3/2013 | Keesara et al. | 370/390 |
| 2013/0142052 A1* | 6/2013 | Burbidge et al. | H04W 76/027 370/242 |
| 2013/0188634 A1 | 7/2013 | Magee | 370/389 |
| 2013/0219034 A1 | 8/2013 | Wang | 709/222 |
| 2013/0258842 A1* | 10/2013 | Mizutani | H04L 41/0668 370/228 |
| 2013/0266012 A1 | 10/2013 | Dutta et al. | 370/392 |
| 2013/0266013 A1 | 10/2013 | Dutta et al. | 370/392 |
| 2013/0343204 A1 | 12/2013 | Geib et al. | 370/248 |
| 2014/0098675 A1 | 4/2014 | Frost et al. | 370/241.1 |
| 2014/0169370 A1 | 6/2014 | Filsfils et al. | 370/392 |
| 2014/0177638 A1 | 6/2014 | Bragg et al. | 370/395.3 |
| 2014/0254596 A1 | 9/2014 | Filsfils et al. | 370/392 |
| 2014/0269266 A1 | 9/2014 | Filsfils et al. | 370/228 |
| 2014/0269421 A1 | 9/2014 | Previdi et al. | 370/254 |
| 2014/0269422 A1 | 9/2014 | Filsfils et al. | 370/254 |
| 2014/0269698 A1 | 9/2014 | Filsfils et al. | 370/389 |
| 2014/0269699 A1 | 9/2014 | Filsfils et al. | 370/389 |
| 2014/0269721 A1 | 9/2014 | Bashandy et al. | 370/392 |
| 2014/0269725 A1 | 9/2014 | Filsfils et al. | 370/392 |
| 2014/0269727 A1 | 9/2014 | Filsfils et al. | 370/392 |
| 2014/0286195 A1 | 9/2014 | Fedyk | 370/254 |
| 2014/0317259 A1 | 10/2014 | Previdi et al. | 709/223 |
| 2014/0341222 A1 | 11/2014 | Filsfils et al. | 370/395.5 |
| 2014/0369356 A1 | 12/2014 | Bryant et al. | 370/392 |

OTHER PUBLICATIONS

Awduche, Daniel O., et al., "RSVP-TE: Extensions to RSVP for LSP Tunnels," Network Working Group, Internet-Draft, Feb. 2001, pp. 1-12.

Awduche, Daniel O., et al., "RSVP-TE: Extensions to RSVP for LSP Tunnels," Network Working Group, Request for Comments 3209, Dec. 2001, pp. 1-61.

Backes, P. and Rudiger Geib, "Deutsche Telekom AG's Statement About IPR Related to Draft-Geig-Spring-OAM-Usecase-01," Aug. 23, 2012, pp. 1-2.

Bryant, S. et al., Cisco Systems, "IP Fast Reroute Using Tunnels-draft-bryant-ipfrr-tunnels-03", Network Working Group, Internet-Draft, Nov. 16, 2007, pp. 1-30.

Bryant, S., et al., Cisco Systems, "Remote LFA FRR," draft-ietf-rtgwg-remote-lfa-04, Network Working Group, Internet-Draft, Nov. 22, 2013, pp. 1-24.

Crabbe, E., et al., "PCEP Extensions for MPLS-TE LSP Protection With Stateful PCE Draft-Crabbe-PCE-Stateful-PCT-Protection-00," Network Working Group, Internet- Draft, Apr. 2013, pp. 1-12.

Crabbe, E., et al., Stateful PCE Extensions for MPLS-TE LSPs, draft-crabbe-pce-statement-pce-mpls-te-00; Network Working Group, Internet- Draft, Apr. 15, 2013, pp. 1-15.

Deering, S., et al., Cisco, Internet Protocol, Version 6 (IPv6) Specification, Network Working Group, Request for Comments 2460, Dec. 1998, pp. 1-39.

Farrel, A., et al., Old Dog Consulting, A Path Computation Element (PCE)—Based Architecture, Network Working Group, Request for Comments 4655, Aug. 2006, pp. 1-80.

(56) References Cited

OTHER PUBLICATIONS

Farrel, A., et al., Old Dog Consulting, Inter-Domain MPLS and GMPLS Traffic Enginerring—Resource Reservation Protocol-Traffic Enginerring (RSVP-TE) Extensions, Newtork Working Group, Request for Comments 5151, Feb. 2008.
Fedyk, D., et al., Alcatel-Lucent, Generalized Multiprotocol Label Switching (GMPLS) Control Ethernet Provider Backbone Traffic Engineering (PBB-TE), Internet Engineering Task Force (IETF), Request for Comments 6060, Mar. 2011, pp. 1-20.
Filsfils, C., et al., Cisco Systems, Inc., "Segment Routing Architecture," draft-filsfils-rtgwg-segment-routing-00, pp. 1-28.
Filsfils, C., et al., Cisco Systems, Inc., "Segment Routing Architecture," draft-filsfils-rtgwg-segment-routing-01, Network Working Group, Internet-Draft, Oct. 21, 2013, pp. 1-28.
Frost, D., et al., Cisco Systems, Inc., "MPLS Generic Associated Channel (G-Ach) Advertisement Protocol," draft-ietf-mpls-gach-adv-00, Internet-Draft, Jan. 27, 2012, pp. 1-17.
Frost, D., et al., Cisco Systems, Inc., "MPLS Generic Associated Channel (G-Ach) Advertisement Protocol," draft-ietf-mpls-gach-adv-08, Internet-Draft, Jun. 7, 2013, pp. 1-17.
Frost, D., et al., Cisco Systems, Inc., "MPLS Generic Associated Channel (G-Ach) Advertisement Protocol," Request for Comments 7212, Jun. 2014, pp. 1-23.
Geib, R., "Segment Routing Based OAM Use Case,"IETF 87, Gerlin, Jul./Aug. 2013, pp. 1-3.
Geib, R., Deutsch Telekom, "Use Case for a Scalable and Topology Aware MPLS data plan moniotoring System," draft-geib-spring-oam-usecase-00; Internet-Draft, Oct. 17, 2013, pp. 1-11.
Geib, R., Deutsch Telekom, "Use Case for a Scalable and Topology Aware MPLS data plan moniotoring System," draft-geib-spring-oam-usecase-01; Internet-Draft, Feb. 5, 2014, pp. 1-10.
Gredler, H., et al., Juniper Networks, Inc., "Advertising MPLS Labels in IS-IS draft-gredler-isis-label-advertisement-00," Internet-Draft; Apr. 5, 2013; pp. 1-13.
Gredler, H. et al., hannes@juniper.net, IETF87, Berlin, "Advertising MPLS LSPs in the IGP," draft-gredler-ospf-label-advertisement, May 21, 2013; pp. 1-14.
Guilbaud, Nicolas and Ross Cartlidge, "Google~Localizing Packet Loss in a Large Complex Network," Feb. 5, 2013, pp. 1-43.
Imaizumi, H., et al.; Networks, 2005; "FMEHR: An Alternative Approach to Multi-Path Forwarding on Packed Switched Networks," pp. 198-201.
Kompella, K. et al, Juniper Networks, "Label Switched Paths (LSP) Hierarchy with Generalized Multi-Protocol Label Switching (GMPLS) Traffic Enginerring (TE)," Network Working Group, Request for Comments 4206, Oct. 2005, pp. 1-14.
Kompella, K., et al., Juniper Networks, Inc., "Detecting Multi-Protocol Label Switched (MPLS) Data Plane Failures," Network Working Group, Request for Comments 4379, Feb. 2006, pp. 1-50.
Kompella, K. et al., Juniper Networks,"Virtual Private LAN Service (VPLS) Using BGP for Auto-Discovery and Signaling," Network Working Group, Request for Comments 4761, Jan. 2007, pp. 1-28.
Kumar, N. et al., Cisco Systems, Inc., "Label Switched Path (LSP) Ping/Trace for Segment Routing Networks Using MPLS Dataplane," draft-kumar-mpls-spring-lsp-ping-00, Oct. 21, 2013, pp. 1-12.
Kumar, N. et al, "Label Switched Path (LSP) Ping/Trace for Segment Routing Networks Using MPLS Dataplane," draft-kumarkini-mpls-spring-lsp-ping-00, Network Work Group, Internet-Draft, Jan. 2, 2014, pp. 1-15.
Previdi, S. et al., Cisco Systems, Inc., "Segment Routing with IS-IS Routing Protocol, draft-previdi-filsfils-isis-segment-routing-00," IS-IS for IP Internets, Internet-Draft, Mar. 12, 2013, pp. 1-27.
Previdi, S. et al., Cisco Systems, Inc., "Segment Routing with IS-IS Routing Protocol, draft-previdi-flsfils-isis-segment-routing-02," Internet-Draft, Mar. 20, 2013, A55 pp. 1-27.
Raszuk, R., NTT I3, "MPLS Domain Wide Labels," draft-raszuk-mpls-domain-wide-labels-00, MPLS Working Group, Internet-Draft, Jul. 14, 2013, pp. 1-6.
Rosen, E. et al., Cisco Systems, Inc., "BGP/MPLS VPNs", Network Working Group, Request for Comments: 2547; Mar. 1999, pp. 1-26.
Sivabalan, S., et al.; "PCE-Initiated Traffic Engineering Path Setup in Segment Routed Networks; draft-sivabalan-pce-segmentrouting-00.txt," Internet Engineering Task Force, IETF; Standard Working Draft, Internet Society (ISOC) 4, Rue Des Falaises CH-1205, Geneva, Switzerland, Jun. 2013, pp. 1-16.
Tian, Albert J. et al., Redback Networks, "Source Routed MPLS LSP Using Domain Wide Label, draft-tian-mpls-lsp-source-route-01.txt", Network Working Group, Internet Draft, Jul. 2004, pp. 1-12.
Vasseur, JP, et al.; Cisco Systems, Path Computation Element (PCE) Communication Protocol (PCEP): Request for Comments: 5440, Internet Engineering Task Force, IETF; Standard, Internet Society (ISOC) 4, Rue Des Falaises CH-1205, Geneva, Switzerland, chapters 4-8, Mar. 2009; pp. 1-87.
Wijnands, Ijsbrand and Bob Thomas, Cisco Systems, Inc,; Yuji Kamite and Hitoshi Fukuda, NTT Communications; "Multicast Extensions for LDP;" Network Working Group; Internet Draft; Mar. 2005; pp. 1-12.
Eckert, Toerless et al., "Traffic Engineering for Bit Indexed Explicit Replication", U.S. Appl. No. 14/814,575, filed Jul. 31, 2015; consisting of Specification, Claims, and Abstract (75 pages); and Drawings (18 sheets).
Eckert, Toerless et al., "Traffic Engineering for Bit Indexed Explicit Replication", U.S. Appl. No. 14/862,915, filed Sep. 23, 2015; consisting of Specification, Claims, and Abstract (75 pages); and Drawings (18 sheets).
Cisco Systems, Inc., "Introduction to Intermediate System-to-Intermediate System Protocol," publicshed 1992-2002; pp. 1-25.
Eckert, T., "Traffic Engineering for Bit Index Explicit Replication BIER-TE, draft-eckert-bier-te-arch-00," Network Working Group, Internet-Draft, Mar. 5, 2015, pp. 1-21.
Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.
Li, T., et al., Redback Networks, Inc., "IS-IS Extensions for Traffic Engineering," Network Working Group, Request for Comments 5305, Oct. 2008, 17 pages.
Vasseur, JP, et al.; Cisco Systems, Inc. "A Link-Type Sub-TLV to Convey the Number of Traffic Engineering Label Switched Paths Signaled with Zero Reserved Bandwidth Across a Link," Network Working Group, Request for Comments 5330; Oct. 2008, 16 pages.
Previdi, Stefano B.; "Segment Routing Using a Remote Forwarding Adjacency Identifier"; U.S. Appl. No. 14/334,300, filed Jul. 17, 2014; consisting of Specification, Claims and Abstract (23 pages); and Drawings (8 sheets).
Previdi, Stefano B; "Segment Routing Extension Headers"; U.S. Appl. No. 14/212,084, filed Mar. 14, 2014; consisting of Specification, Claims and Abstract (43 pages); and Drawings (17 sheets).
Filsfils, C. et al., Cisco Systems, Inc., "Segment Routing Interoperability with LDP", draft-filsfils-spring-segment-routing-ldp-interop-01.txt; Apr. 18, 2014, pp. 1-16.
Eckert, Toerless et al., "Failure Protection for Traffic-Engineering Bit Indexed Explicit Replication", U.S. Appl. No. 15/054,480, filed Feb. 26, 2016; consisting of Specification, Claims, Abstract, and Drawings (76 pages).
Alcatel-Lucent, "Segment Routing and Path Computation Element—Using Traffic Engineering to Optimize Path Placement and Efficiency in IP/MPLS Networks"; Technology White Paper; 2015; 28 pages.
Awduche, D. et al., "Requirements for Traffic Engineering Over MPLS"; Network Working Group; Request for Comments: 2702; Sep. 1999; pp. 1-29.
Awduche, D. et al., "Overview and Principles of Internet Traffic Engineering"; Network Working Group; Request for Comments: 3272; May 2002; pp. 1-71.
Filsfils, C. et al., "Segment Routing Architecture", draft-ietf-spring-segment-routing-07; Network Working Group, Internet-Draft; Dec. 15, 2015; pp. 1-24.
Filsfils, C. et al., "Segment Routing Use Cases", draft-filsfils-rtgwg-segment-routing-use-cases-02; Network Working Group; Internet-Draft; Oct. 21, 2013; pp. 1-36.
Previdi, S. et al., "IS-IS Extensions for Segment Routing", draft-ietf-isis-segment-routing-extensions-06; IS-IS for IP Internets, Internet-Draft; Dec. 14, 2015; pp. 1-39.
Psenak, P., et al. "OSPF Extensions for Segment Routing", draft-ietf-ospf-segment-routing-extensions-05; Open Shortest Path First IGP; Internet-Draft; Jun. 26, 2015; pp. 1-29.

* cited by examiner

LOOP AVOIDANCE DURING NETWORK CONVERGENCE IN SWITCHED NETWORKS

FIELD OF THE DISCLOSURE

This disclosure relates to networking and, more particular, to handling network traffic after a failure occurs.

BACKGROUND

Certain types of network protocols append a set of labels or other metadata to a packet in order to specify the path that packet should take through a network. For example, multi-protocol label switching (MPLS) can specify by prefixing the packet with a list of network nodes through which the packet must pass. To implement such a protocol, each node within the network can maintain a forwarding table that stores the forwarding information usable to identify one or more paths from that node to a potential destination node. This forwarding information can be used when appending labels to a packet.

While these protocols work well during normal operations, difficulty may arise when network failures occur. For example, if a network node fails, the forwarding information that identifies that node may no longer be usable. Accordingly, each node that maintains forwarding table information identifying the now-failed node will need to update its forwarding table. Once each node that needs to do so has updated its forwarding information after a failure, and thus the network has converged on a new consistent state, the network is said to have reached post-convergence.

Nodes know to update their forwarding tables in response to receiving some sort of error indication. Unfortunately, given that different nodes and network links can be located at different distances from the failed node and/or have different operating characteristics, it is unlikely that each node will update its forwarding information at the same time. Accordingly, during the time after a failure (i.e., the time in which the network is converging), some nodes may still be using forwarding information that identifies the failed node or link. As a result of this, operating errors, such as loops within the network, may arise during the time the network is converging.

BRIEF DESCRIPTION OF THE DRAWINGS

The present disclosure may be better understood, and its numerous objects, features, and advantages made apparent to those skilled in the art by referencing the accompanying drawings.

Figure 1:
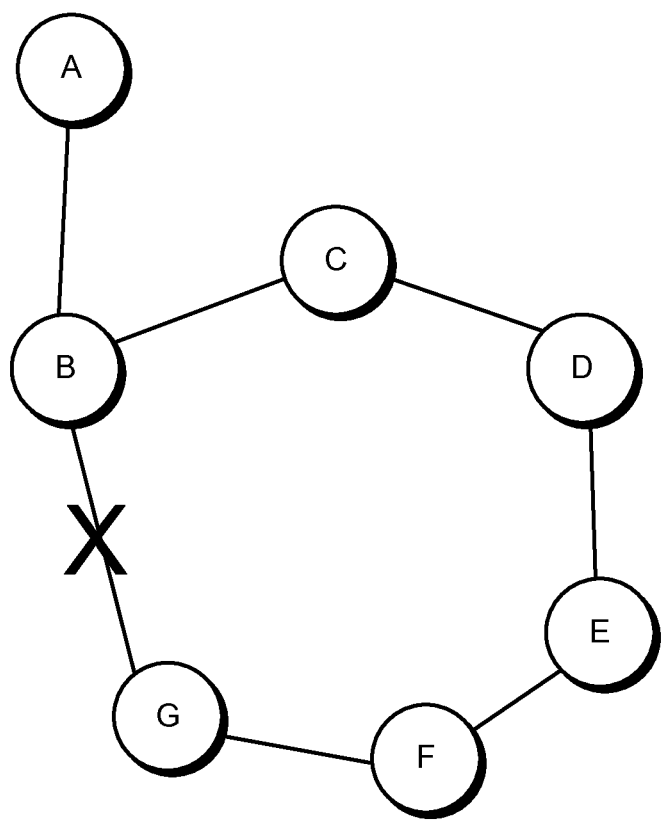
FIG. 1 is a block diagram illustrating an example network, according to one embodiment.

While the disclosure is susceptible to various modifications and alternative forms, specific embodiments are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the appended claims.

DETAILED DESCRIPTION

Overview

Various techniques are disclosed for reducing loops during network convergence after a failure. These techniques work with forwarding mechanisms, such as Segment Routing, which is described in more detail below, that allow a node to identify a path through the network either by explicitly identifying each of series of hops between pairs of nodes or by implicitly identifying such a series using implicit identifiers that each represent a set of multiple consecutive hops.

In one embodiment, a method, performed by a first network node, involves detecting a topology change within a network. The topology change disrupts an existing forwarding path between the first network node and a destination network node. The network implements segment routing (SR) protocol to send packets between nodes. The method then involves calculating new forwarding table information in response to the topology change, such that the new forwarding table information includes at least one updated forwarding path from the first network node to the destination network node. The new forwarding table information is generated according to the SR protocol. The method then identifies a maximum time for at least a portion of the network to reach a post-convergence state with respect to the topology change. Until the maximum time has elapsed at the network node, the method involves explicitly specifying at least a portion of the updated forwarding path in packet headers of any packets being sent from the first network node to the destination network node. After the maximum time has elapsed at the network node, the method involves non-explicitly specifying the portion of the updated forwarding path in packet headers of any additional packets being sent from the first network node to the destination network node.

MPLS and SR Overview

Internet Protocol (IP) routing and Multiprotocol Label Switching (MPLS) are distinct packet forwarding mechanisms. IP routing uses IP addresses inside packet headers to make forwarding decisions. In contrast, MPLS nodes (i.e., nodes employing MPLS) can make forwarding decisions using short path identifiers called labels that are attached to packets. Segment routing (SR) is yet another mechanism that can be employed. SR is similar to MPLS in many regards. For example, forwarding decisions in SR can be based on short path identifiers called segment IDs that are attached to packets. However, substantial differences exist between SR and MPLS as will be more fully described below.

IP Routing

IP routing uses routing tables that maintain forwarding information to various destinations. In one embodiment, when a packet arrives at a node, the node can use the destination IP address in the packet header to access a routing table and lookup corresponding forwarding information such as an egress interface, which is the interface or port to be used to forward the packet to the next node on a path to the packet's final destination. After the packet is forwarded the next node performs its own routing table lookup using the same destination IP address, and so on.

MPLS

MPLS is commonly employed in provider networks or networks that provide packet transport and other services for customers. Packets enter an MPLS provider network via an ingress provider edge (PE) node, travel hop-by-hop along a label-switched path (LSP) that includes one or more core nodes, and exit the provider network via an egress PE node.

Packets are forwarded along an LSP based on Label Distribution Protocol (LDP) forwarding tables and labels attached to packets. Labels allow for the use of very fast and simple forwarding engines in the dataplane of LDP nodes.

A label is a short, fixed-length, locally significant identifier that can be associated with a forwarding equivalence class (FEC). Packets associated with the same FEC should follow the same LSP through the provider network. LSPs can be established for a variety of purposes, such as to guarantee a certain level of performance when transmitting packets, to forward packets around network congestion, to create IP tunnels for network-based virtual private networks, etc.

LDP is employed in the control plane of LDP nodes. Two nodes, called LDP peers, exchange label mapping information on a FEC by FEC basis. The exchange of information can be bi-directional. LDP generates labels for, and exchanges labels between, peer nodes. LDP can be used to build and maintain LDP forwarding tables that map labels and node interfaces. These forwarding tables can be subsequently used by nodes to forward packets through MPLS networks as more fully described below.

When a packet is received by an ingress PE node of an MPLS network, the ingress PE node may determine a corresponding FEC. Characteristics for determining the FEC for a packet can vary, but typically the determination is based on the packet's destination IP address. Quality of Service for the packet may also be used to determine the FEC. Once determined, the ingress PE node can access a table to select a label that is mapped to the FEC. The table may also map an egress interface to the FEC. Before the ingress PE node forwards the packet via the egress interface, the ingress PE node pushes or attaches the label to the packet.

A packet with attached label can be forwarded along an LSP, and nodes in the LSP can make forwarding decisions based on labels. To illustrate, when an LDP node receives a packet with an attached label (i.e., incoming label), an LDP forwarding table in the node can be accessed to read an egress interface and a label (i.e., an outgoing label) mapped to the incoming label. Before the packet is forwarded via the egress interface, the node may swap the incoming label with the outgoing label. The next hop receives the packet and attached label and may perform the same process. This process is often called hop-by-hop forwarding along a non-explicit path. The egress PE node in the LSP may pop or remove an incoming label before the packet is forwarded to a customer.

Segment Routing

Segment routing (SR), which can also be referred to as chain routing (CR), is a mechanism in which packets can be forwarded using SR forwarding tables and segment identifiers (IDs) attached to packets. Like MPLS, SR enables very fast and simple forwarding engines in the dataplane of nodes.

SR nodes (i.e., nodes employing SR) are similar to LDP nodes in many ways. Since most SR nodes make forwarding decisions based on segment IDs as opposed to labels, however, SR nodes need not employ LDP in their control planes. Unless otherwise indicated, an SR node lacks LDP in the control plane. Additional differences can exist between SR nodes and LDP nodes.

SR can be employed in provider networks. Packets enter an SR enabled provider network via an ingress provider edge (PE) node, travel hop-by-hop along a segment-switched path (SSP) that includes one or more core nodes, and exit the provider network via an egress PE node. Much of the remaining disclosure will make reference to an autonomous, provider network that operates under one administrative domain, although SR can be employed over multiple administrative domains as well. In general a provider network may contain a contiguous set of nodes.

In some embodiments, like labels, segment IDs are short (relative to an IP address or a FEC), fixed-length identifiers. Segment IDs may correspond to topological segments of a provider network or services provided by nodes thereof. Topological segments can be one hop paths to SR nodes, or they can be multi-hop paths to SR nodes. Topological segments act as sub-paths that can be combined to form an SSP. Stacks of segment IDs can represent SSPs, as will be described below. Like LSPs, SSPs can be associated with FECs. Thus segment ID stacks may correspond to FECs.

There are several types of segment IDs, including but not limited to: nodal-segment IDs and adjacency-segment IDs. A nodal-segment ID represents a one-hop or a multi-hop path within the provider network to an associated SR node. Nodal-segment IDs are assigned to respective SR nodes within the provider network so that no two SR nodes in the provider network are assigned the same nodal-segment ID. In one embodiment, all assigned nodal-segment IDs are selected from a predefined ID range (e.g., [64, 5000]) for the provider network. The range for nodal-segment IDs may be different from a predefined range for labels.

Nodal-segment IDs can be assigned to SR nodes, in some embodiments, by a server such as a path computation element (PCE) server. When an SR node is powered on, the SR node can send a query to the PCE server requesting a nodal-segment ID. In response, the PCE server can respond with an appropriate identifier from the predefined ID range. The PCE server can maintain a record (e.g., in a data structure in memory, in a file on a hard drive, and the like) that indicates which nodes have been assigned nodal-segment IDs. If the requesting SR node has not already been assigned a nodal-segment ID, the PCE server can select an unused ID from the ID range, send a response containing the selected ID, and update the record to show that the requesting node has been assigned the selected ID. If the requesting SR node has already been assigned a nodal-segment ID (e.g., before being powered down), the PCE server can access the record to obtain the already-assigned nodal-segment ID and return that ID to the requesting SR node.

Instead of sending IDs in response to requests from SR nodes, the PCE server can alternatively identify that a newly-booted SR node needs a nodal-segment ID and assign (and send) that SR node a nodal-segment ID without having first received a request from that SR node. Similarly, a PCE server can identify that an SR node that already has one or more assigned nodal-segment IDs needs a new nodal-segment ID (in order to provide an alternative path to that SR node) and can thus similarly assign and send the SR node its additional nodal-segment ID.

In addition to providing nodal-segment IDs, the PCE server may, in some embodiments, also specify the type of algorithm to be used when calculating the path identified by that nodal-segment ID. In such embodiments, the SR nodes do not need to be preconfigured with the identity of the particular type of algorithm(s) to use in nodal-segment path calculation.

The SR nodes can map their respectively assigned nodal-segment IDs in memory to unique identifiers. For purposes of explanation only, nodal-segment IDs are mapped to respective node loopback prefix IP addresses. One of ordinary skill understands that node loopback prefix IP addresses (node prefixes for short) distinguish the SR nodes from each other within the provider network. The node prefixes can be used by link state protocols such as open shortest path first (OSPF) or intermediate system to intermediate system (IS-IS), or modifications thereof, operating in the control plane of an SR node to identify egress interfaces for paths to respective SR nodes. Once identified, the appropriate egress interfaces for the paths can be mapped to nodal-segment IDs within an SR forwarding table as the SR forwarding table is created or subsequently updated.

In some embodiments, the link state protocols can calculate paths to SR nodes using a variety of different algorithms. A default path-calculation algorithm (e.g., a Dijkstra shortest path rooted at the SR node to which the path leads) may be used if no specific algorithm is specified; if an algorithm is specified for a particular path, however, all SR nodes will use the same specific algorithm when calculating that path. As described above, each SR node uses the path calculation in order to identify the appropriate egress interface to add to its SR forwarding table for a given nodal-segment ID.

Examples of the different algorithms that can be used to calculate a path to an SR node include Dijkstra algorithms rooted at that SR node that have one or more of the following characteristics: use of an IGP metric; use of an IGP extended latency metric; bounds on a cumulative metric; exclusion of links with loss larger than a threshold; exclusion or inclusion of a set of one or more shared risk link groups (SRLGs); use of a set of affinities; and the like. In general, the algorithms that can be used can include those used to calculate the shortest-path on any metric (not only that used by IS-IS metric), those with bounds on metrics, those having non-cumulative metrics (e.g., such as those handling optical non-linear impairments), those used to calculate non-shortest paths (e.g. reverse-Dijkstra algorithms), those enforcing disjointness based on SRLG and/or affinity, those enforcing inclusion based on SRLG and/or affinity, and the like. Thus, a node could advertise its nodal-segment ID along with a flag indicating that the algorithm used to compute the path associated with that nodal-segment ID is a Dijkstra rooted at the node on metric m2 with a bound on latency and exclusion of links with loss larger than a threshold and exclusion of SRLG 23.

In some embodiments, it may be desirable, from a traffic engineering standpoint, for there to be two (or more) different nodal segments leading to the same SR node. In such embodiments, that SR node can be assigned two different nodal-segment IDs (e.g., each of which can then be mapped to a different node prefix). In these situations, the distinct paths are each calculated using a different algorithm. Accordingly, another node can include multiple nodal-segment IDs for segments leading to the same SR node in its SR forwarding table, but each of these nodal-segment IDs may be associated with a different egress interface, which is identified using the specific algorithm used to calculate the respective nodal-segment identified by each nodal-segment ID.

One example of a situation in which it is desirable to have multiple nodal-segments leading to the same SR node involves traffic between two continents. There may be two different undersea cables available to carry this traffic. As such, one nodal-segment can be defined for a path using the first undersea cable (e.g., for standard customers' traffic) and another nodal-segment can be defined for the path using the second undersea cable (e.g., for premium customers' traffic). The first path can be computed using an IS-IS shortest path algorithm while the second can be computed using an algorithm that takes a latency metric into account.

Multiple nodal-segments leading to the same SR node can also be implemented for customers who desire to have multiple disjoint (non-overlapping) paths between customer locations. Here, algorithms that use different exclusion constraints can be used to calculate those disjoint paths.

An adjacency-segment ID represents a link between adjacent SR nodes. For purposes of explanation only, this disclosure will refer to a link between nodes as an adjacency segment (hereafter adjacency). Adjacencies can be uniquely identified in the provider network. For purposes of explanation only, this disclosure will identify an adjacency (hereafter adjacency-ID) using the node prefixes of nodes between which the adjacency is immediately positioned. To illustrate, for an adjacency between two nodes identified by node prefix X and node prefix Y, the adjacency will be identified herein as adjacency-ID XY. This disclosure will presume that only one adjacency exists between nodes in the provider network, it being understood the present disclosure should not be limited thereto. As such, adjacencies are unique in the provider network of this disclosure. Since adjacencies are unique, it follows that adjacency-IDs are likewise unique. Adjacency-IDs should not be confused with adjacency-segment IDs; adjacency-segment IDs may not be unique within the provider network domain.

Each SR node can assign a distinct adjacency-segment ID for each of the SR node's adjacencies. Separate SR nodes may assign the same adjacency-segment ID. Adjacency-segment IDs, however, are locally significant; separate SR nodes may assign the same adjacency-segment ID, but that adjacency-segment ID represents distinct adjacencies. In one embodiment, adjacency-segment IDs are selected from a predefined range that is outside the predefined range for nodal-segment IDs. The predefined range of adjacency-segment IDs may also be outside the predefined range for labels.

SR nodes can advertise their nodal-segment IDs, adjacency-segment IDs, and node prefixes to other SR nodes in the provider network using a protocol such as interior gateway protocol (IGP) or a modification thereof. SR nodes can use the nodal-segment IDs, adjacency-segment IDs, node prefixes, and/or other information to create or update SR forwarding tables and/or segment ID stacks.

In one embodiment the SR nodes can advertise their nodal-segment ID/node prefix pairs, adjacency-segment ID/adjacency-ID pairs, and/or the like. The control planes of an SR node can receive and use the nodal-segment ID/node prefix pairs and a link-state protocol such as IS-IS or OSPF, or modified versions thereof, to identify egress interfaces for paths to SR nodes, using the appropriate algorithms identified (if any) in the advertisements of the nodal-segment to those SR nodes or a default algorithm (e.g., a Dijkstra shortest path rooted at the appropriate SR node). An egress interface, once identified, can be mapped to its respective nodal-segment ID in the node's SR forwarding table.

Nodes also map their adjacency-segment IDs to egress interfaces for respective adjacencies in SR forwarding tables. Because adjacency-segment IDs are locally significant, however, adjacency-segment IDs should only be mapped in SR forwarding tables of the nodes that advertise the adjacency-segment IDs. In other words, an SR node that advertises an adjacency-segment ID/adjacency-ID pair should be the only node in the provider network that has a SR forwarding table that maps the adjacency-segment ID to an egress interface connected to an adjacency identified by the adjacency-ID.

In one embodiment, SR nodes can use a sub-type-length-value (sub-TLV) in an IS-IS protocol link state packet to advertise IDs. This sub-TLV can include information identifying the ID being advertised, as well as the type of that ID (e.g., nodal-segment ID, adjacency-segment ID, or the like). The sub-TLV can also include information (e.g., in the form of a flag) for nodal-segment IDs that indicates how to calculate the path identified by that nodal-segment ID (e.g., using shortest IGP metric, extended latency IGP metric, and the like). Information that identifies the path associated with the advertised ID in terms of a hop list or SR stack may also be included. In some embodiments, the sub-TLV may also include information identifying the domain to which the ID belongs (e.g., in systems that support SR across multiple domains) and/or that the ID is being linked (via redistribution) to another segment ID within a different domain (if the latter, the linked segment ID can also be included in the sub-TLV). (Performing SR across multiple domains is discussed in more detail below.) The sub-TLV can be part of a larger TLV (e.g., such as TLV22, TLV135, and the like) within the link state packet.

Segment Routing (SR) enables segment-switched paths (SSPs), which can be used for transporting packets through the provider network. Like LSPs, SSPs are typically associated with FECs, and can be established for a variety of purposes, such as to guarantee a certain level of performance. Packets associated with the same FEC will typically follow the same SSP of SR nodes through the provider network. Nodes in SSPs make forwarding decisions based on segment IDs, not based on the contents (e.g., destination IP addresses) of packets. As such, packet forwarding in SSPs is not dependent on a particular Layer 2 technology.

SR nodes can use nodal-segment IDs and adjacency-segment IDs they receive in advertisements from other SR nodes in order to create ordered lists of segment IDs (i.e., segment ID stacks). Segment ID stacks correspond to SSPs, respectively, that forward packets between nodes (e.g., SR enabled ingress and egress nodes) in the provider network. Segment IDs in a stack may correspond to respective segments or sub paths of a corresponding SSP. When an SR source node (e.g., an SR ingress PE node) receives a packet, the node can calculate a FEC for the packet in much the same way that LDP ingress PE nodes calculate FECs for packets received from a customer edge router. The SR source node uses the FEC it calculates to select a segment ID stack mapped thereto. The SR source node can add the selected segment ID stack to a header, and then attach the header to the packet. The packet with attached stack can traverse the segments of the SSP in an order that corresponds to the list order of the segment IDs in the stack. A forwarding engine operating in the dataplane of each SR node can use a segment ID within the stack and an SR forwarding table in order to forward the packet and header to the next node in the SSP. As the packet and attached header are forwarded along the SSP in a hop-by-hop fashion, the attached stack of segment IDs remains unchanged in one embodiment.

When creating a segment stack to include in a header of packet to be routed via a network of SR nodes, an SR node can use any of the segments identified in its SR forwarding table. As described above, these segments can identify paths calculated using any of a variety of different algorithms, such that a given segment stack can identify segments calculated using different algorithms. For example, a segment stack listing segment IDs A, B, D, E, F can include two paths (e.g., those identified by segment IDs A and B) calculated using a first algorithm and another path (e.g., identified by segment ID E) calculated using an entirely different algorithm.

Segment stacks can be constructed in any manner needed for traffic engineering purposes. Additionally, a node can use any of the identified segments in its SR forwarding table to form a segment stack. Furthermore, a node may select bits and pieces of paths identified by different segments in order to create a segment stack. Thus, a node can combine different segments into a segment stack for a variety of reasons. One reason is to define a new path that is not explicitly defined by any existing segment. Thus, to get a packet from node A to node F, a segment stack created by node A can include one segment that goes to node B, and another segment that includes node B (but doesn't necessarily have to start with node B) and goes to node F. As noted above, these two segments can cover paths calculated using different algorithms.

Another reason for combining different segments is in order to reduce the number of segment identifiers in the stack. For example, a node can determine that a packet should be routed over a path that passes through six nodes ABCDEF in that exact order. While the node could use six adjacency segments to route the packet, the segment stack would need to include all six identifiers of those adjacency segments. As an alternative, the SR node can examine its forwarding table and determine that the nodal-segment to node C includes nodes A and B, and that the nodal-segment to node F includes nodes D and E. Based on these determinations, the SR node can simply include the nodal-segment to C followed by the nodal-segment to F in the segment stack, reducing the number of identifiers from six to two.

Loop Avoidance During Network Convergence

FIG. 1 illustrates a very simplified network that includes seven network nodes: A, B, C, D, E, F, and G. Each node is a network device such as a switch or router, and the nodes can be interconnected by any appropriate type of communication links. These nodes communicate packets using a protocol such as SR.

In the example of FIG. 1, an X marks the spot where a network failure has occurred, which prevents nodes B and G from communicating with each other via the communication link that directly interconnects them. Before this failure occurred, node E sent half of its traffic to node A via node F (e.g., using an SR stack identifying the path F-G-B-A) and the other half of its traffic to node A via node D (e.g., using an SR stack identifying the path D-C-B-A). Node F sends all of this traffic it receives from node E to node G, which in turn sends all of that traffic to node B.

When the link connecting nodes B and G fails, each of these nodes will detect the failure and begin propagating a corresponding error indication identifying the failure to the other nodes in the network. This error indication can be a link state protocol data unit (PDU), or LSP, or any other appropriate protocol message. In response to detecting the failure (e.g., in response to receiving an LSP indicating the error), each node will in turn update its view of the network (e.g., by updating a link state database (LSB) (e.g., as used to implement IS-IS, OSPF, or any other LS routing protocol) or other appropriate data structure), and, if needed by this updated view of the network, recalculate one or more network paths (e.g., using a shortest path algorithm) and update its forwarding tables accordingly.

Specifically in the example of FIG. 1, in response to receiving an indication that the link between nodes B and G has failed, node F will update its forwarding information to indicate that all traffic to node A should be forwarded along the path E-D-C-B-A. Similarly, node E will update its forwarding information to indicate that all traffic to node A should be forwarded along the path D-C-B-A.

While the error indication is being propagated through the network and the nodes are updating their network views, different nodes may be in different states. A pre-convergence state exists for all nodes that have not yet completed necessary updates to their forwarding information. A post-convergence state exists for all nodes that have made the needed updates to their forwarding information.

In general, nodes can reach the post-convergence state at different times due to a variety of factors. For example, some nodes may receive the error indication more quickly (e.g., due to faster network links, less intervening network congestion, fewer intervening nodes, and the like). Additionally, some nodes may take longer to make all the appropriate updates after detecting a failure (e.g., due to having more forwarding information to process, due to having less processing power, and the like).

Additionally, some nodes may not need to update their forwarding tables in response to detecting a network failure. For example, before the failure, node C may not send any packets via the link between nodes B and G, and thus all of node C's forwarding information is still valid after the failure of this link. Accordingly, while node C will still update its view of the network in response to detecting the failure, node C's pre- and post-convergence forwarding table states are the same. Accordingly, node C is already in the post-convergence state at the time the failure occurs.

While there are nodes within the network operating in both pre- and post-convergence states, errors can arise. For example, node F may arrive in a post-convergence state before node E. As a result, node E, while in the pre-convergence state, may still be sending half of its traffic to node A to node F. Node F, which is already in the post-convergence state, then sends this traffic back to node E, effectively creating a loop. Thus, while the network is in the process of converging, undesirable traffic loops can arise.

Many existing solutions to this issue focus on reducing or even eliminating the convergence window (i.e., the length of time it takes for the network to reach a post-convergence state and thus the length of time in which different nodes may be in different states). For example, all nodes may wait to update their forwarding tables, allowing all of the nodes to make the transition at approximately the same time. While this may avoid forwarding errors like the loops described above, it may also negatively impact network performance, since invalid paths may be identified before the forwarding table updates.

Here, instead of attempting to minimize the convergence window, the network nodes handle convergence by selecting to explicitly specify paths (e.g., using SR adjacency IDs, which specify a single network hop between two directly connected nodes) through the network during the potential convergence window, and then specifying paths normally (e.g., using more implicit techniques, such as SR nodal IDs, which can specify multi-hop paths) after the potential convergence window closes.

In particular, each node can be configured to identify a time during which the network may be inconsistent. This time can be preconfigured, or it can be derived from information obtained from a network protocol such as OSPF, depending on the embodiment. After the node recalculates any paths and/or makes any needed forwarding table updates in response to detecting a network failure, the node starts a timer set to the identified time. During this time, the node forwards all packets using explicit path identifiers. This state is referred to as the explicit post-convergence state. Once this time has elapsed, the node forwards all packets normally, using implicit path identifiers when available. This state is referred to as the classic post-convergence state. (Using implicit path identifiers that can identify multi-hop segments is desirable, since doing so can result in more compact packet heads, since fewer identifiers are needed to identify the same path.)

In one embodiment, the time that tells a node how long to stay in the explicit post-convergence state can be selected as the maximum time needed for all of the nodes in the network to at least reach the explicit post-convergence state. All nodes in the same network can use the same time value.

While all nodes may use the same time value, it is noted that different nodes will nonetheless be in the explicit post-convergence state at different times. Accordingly, the explicit post-convergence state will start earliest at those nodes that detect the error and reach post-convergence soonest (which are likely to be the nodes closest to the failure), and will then ripple outwards to nodes that reach post-convergence later. Accordingly, some nodes may already be in the classic post-convergence state while other nodes are still in the explicit post-convergence state.

In some embodiments, in order to reduce the number of identifiers that might otherwise need to be included in a packet header generated during the explicit post-convergence state, network nodes may also be configured with a number N of hops required to reach the part of the network where the pre- and post-convergence states are identical (i.e., because those nodes are unaffected by the failure). To be most conservative, N can be set higher, or even at infinity, thus causing paths to be explicitly specified from beginning to end within the network.

However, based on capacity planning analysis, a lower value of N can be selected, thus allowing smaller packet headers to be used (e.g., by requiring smaller SR stacks containing fewer SR IDs). Here, while in the explicit post-convergence state, a node would explicitly specify the first N hops of each path, but could then use normal techniques (including those in which a single identifier can identify a multi-hop segment) for the remainder of the path.

Returning to FIG. 1, if N is selected to be 3 (e.g., as configured by an administrator), in the explicit post-convergence state, node G can specify the path to node A by sending a packet to node F specifying the adjacency between nodes F and E, the adjacency between nodes E and D, and the adjacency between nodes D and C. After that, node G can implicitly identify the remainder of the path to node A using a multi-hop identifier (e.g., using the nodal segment ID for node A).

Once the time for remaining in the explicit post-convergence state has elapsed for node G, node G can move into the class post-convergence state. In this state, node G can specify the path to node A normally. For example, to optimize the packet headers of packets being sent to A, G can simply include a multi-hop identifier such as an SR nodal segment ID. While this classic state allows paths to be specified implicitly, it is important to recognize that both the explicit and the classic post-convergence states identify the exact same paths; they just do so using different techniques.

The node (e.g., node G in this example) that generates the header for a particular can be any one (or more, in some situations) of a number of nodes that processes the packet. For example, in some embodiments, the node can be the ingress node for the packet (e.g., the node via which the packet enters the SR network). Alternatively (or additionally), the node can be the node that exists at the point at which the pre- and post-convergence states initially differ from each other.

While this example focuses on a situation in which a network link fails, other failures or other topology changes can also create similar problems. For example, if a node is removed from the network (e.g., if an administrator takes that node offline in order to perform maintenance), that failure can be handled in a similar manner. Thus, this technique can be used in a variety of different situations, including node and/or link failures and/or restorations.

Figure 2:
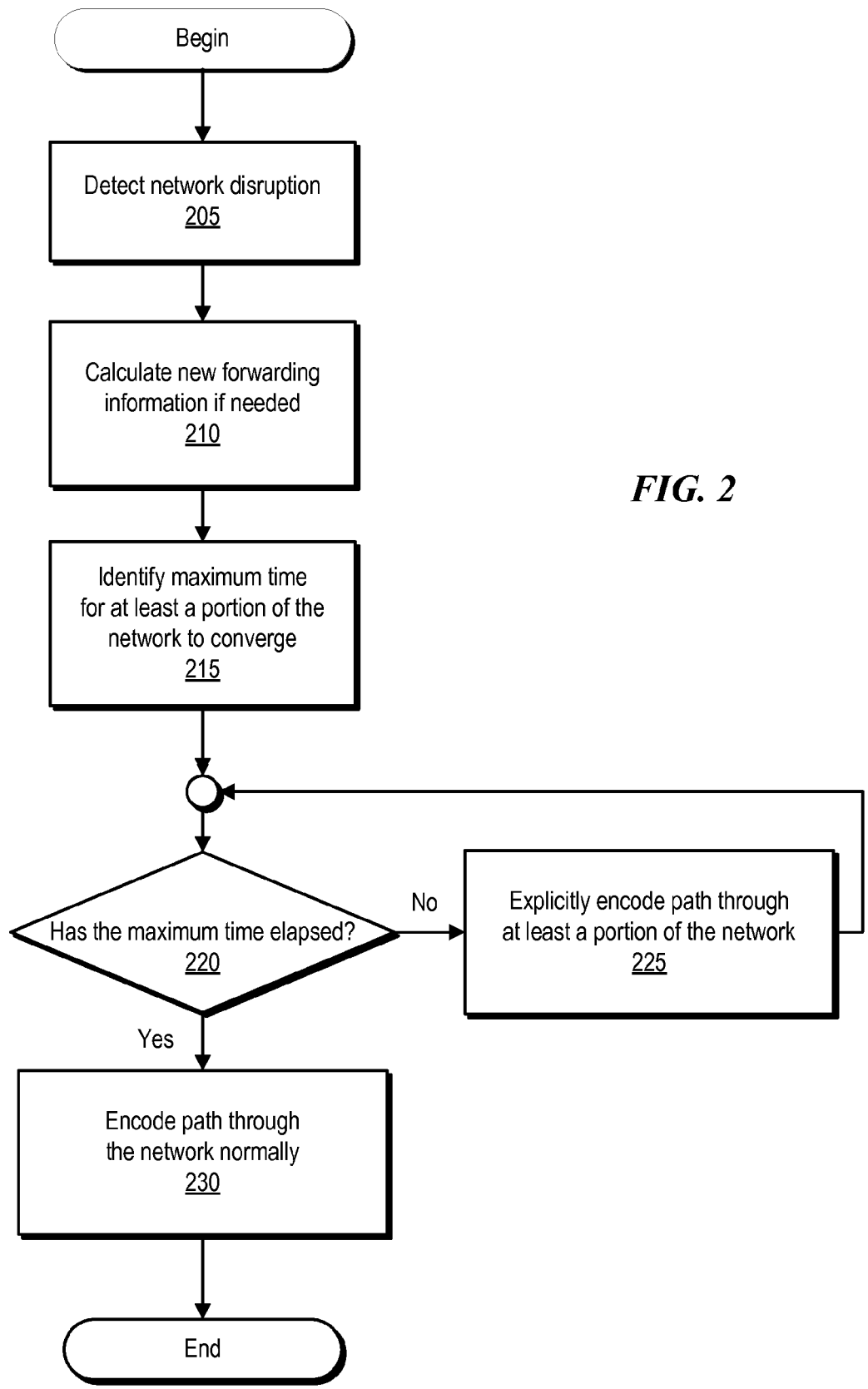
FIG. 2 is a flowchart of an example method of reducing loops during network convergence after a failure, according to another embodiment.

FIG. 2 illustrates a method that can be performed by a node like those shown in FIG. 1 in order to avoid loops during network convergence. It is noted that for a given failure, this method may be performed by each node in the network, and that, as described above, each node may perform this method at a different time than its neighbors.

The method begins at 205, when the node detects a network disruption. This operation can be performed in response to receiving an error indication, in response to detecting the failure of a node to send a keep-alive message, and the like. This disruption requires that the node update its network view due to a change in the network (e.g., an unavailable node, a failed link, or the like).

Upon detecting the disruption, the node updates various state information. For example, the node updates its network view (e.g., by updating a LSDB or OSPF graph) and, if needed, updates its forwarding information, as shown at 210. A node will need to update its forwarding information if the failure detected at 205 renders some of its existing forwarding information invalid.

At 215, the node identifies a maximum time for at least a portion of the network to converge, or reach a post-convergence state. The node can identify this time by accessing a value configured by an administrator, calculating a value from protocol information (e.g., such as provided by OSPF), or the like. In many embodiments, all nodes in the same network will use the same value. In some embodiments, this time is specified to be the maximum time for the entire network to reach an explicit post-convergence state.

At 220, a determination is made as to whether the maximum time identified at 220 has elapsed (e.g., using a timer). This time can be measured from the time that the node completes operation 210. If the time has not elapsed, the node is still in an explicit post-convergence state, and will need to explicitly specify at least a portion of the path through the network for each packet being forwarded, as shown at 225. As mentioned above, in some embodiments, while in this state, the node may explicitly encode the entire path. In other embodiments, the node may only explicitly encode the first N hops of the path. This operation can be performed using SR segment IDs, and in particular, SR adjacency segment IDs.

Once the maximum time has elapsed, as detected at 220, the node can begin processing packets in the classic post-convergence state. Here, the node encodes paths through the network normally, as shown at 230. Accordingly, paths can be specified non-explicitly (e.g., using SR nodal segment IDs).

Figure 3:
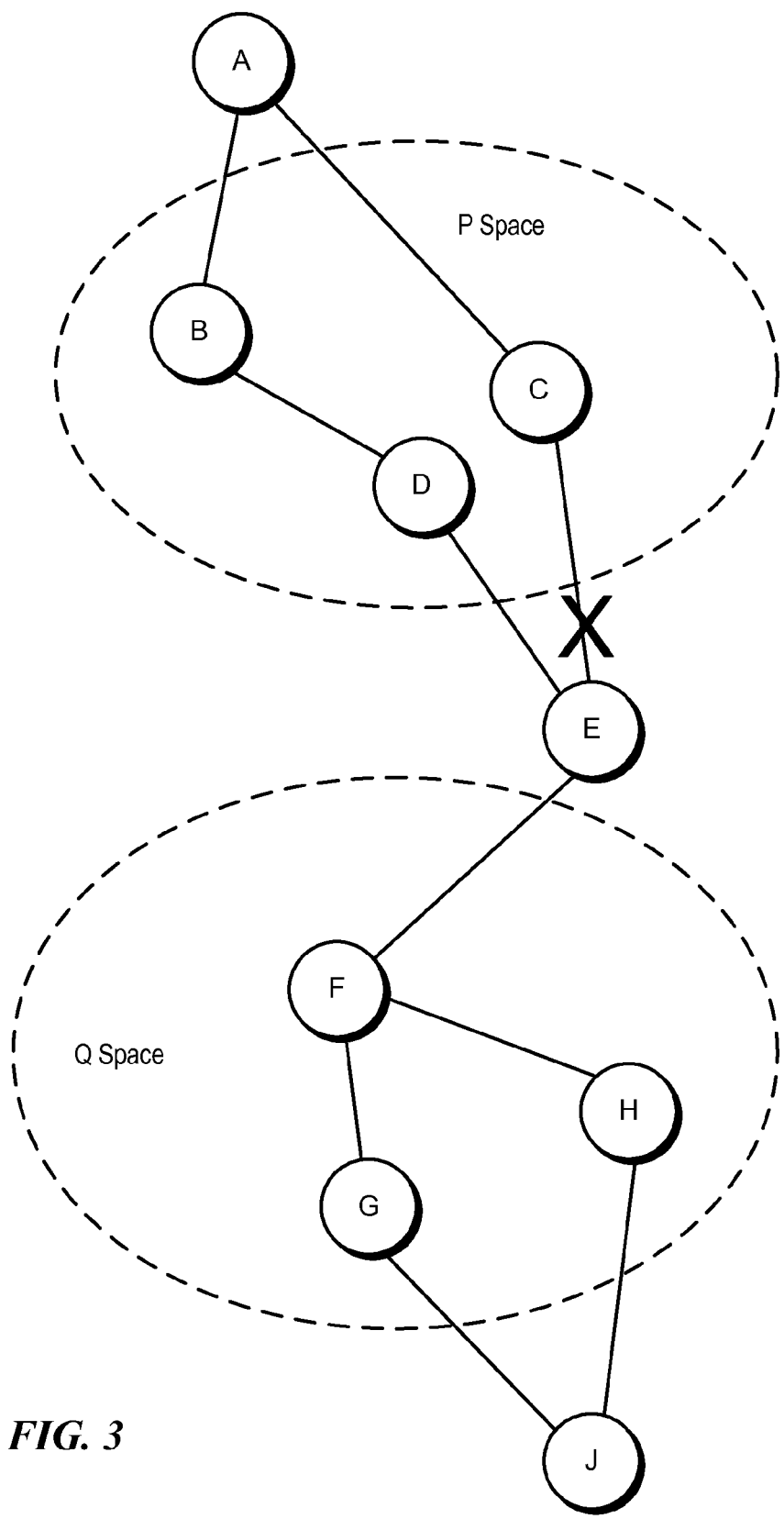
FIG. 3 is a block diagram of another example network, according to one embodiment.

In certain situations, the packet headers generated during the explicit post-convergence state can be additionally optimized. FIG. 3 shows another simplified example of a network, which contains nodes A, B, C, D, E, F, G, H, and J. Here, a network failure has occurred between nodes C and E.

In this example, as part of updating its network view in response to a failure, a node can identify two sets of nodes: nodes in the "p space" and nodes in the "q space." Nodes in the p space are nodes that the node can communicate with without being affected by the failure (e.g., without needing to update its forwarding information). In this example, as identified by node A, the p space includes nodes B, C, and D, since node A can communicate with these nodes in the same manner both before and after the failure.

It is noted that each node may identify its own p space. Thus, node G, can have a drastically different p space than node A. The nodes in a given p space can vary based upon where the failure is and upon which node is identifying the p space.

A node also identifies one or more q spaces in response to a failure. A q space is a set of nodes that communicate with a destination node without being affected by a network failure. Here, node A has identified a q space for destination node J. This q space includes nodes F, G, and H, since these nodes can communicate with node J in the same manner both before and after the failure.

As with the p spaces, q spaces can vary. Q spaces differ based upon the location of the failure and the identity of the particular destination for which that q space is being calculated.

Once a node has identified its p space and a q space for a given destination, that node can improve the way it specifies paths while in the explicit post-convergence state. Instead of needing to explicitly specify every hop in the path, the node can instead specify an implicit path to the edge of its p space, an explicit path between the p space and q space, and then an implicit path within the q space.

Here, while in the explicit post-convergence state, node A can specify a path to node J as follows: an implicit (i.e., non-explicit) path to node D at the edge of p space; an explicit path to the edge of q space: from node D to node E and from node E to node F, and an implicit path within the q space to the destination node J. Accordingly, node A could use a multi-hop SR nodal segment ID for node D, SR adjacency segment IDs to specify the path from p space to q space, and another multi-hop SR nodal segment ID for node J.

In this example, the p space and q space are non-overlapping. However, in some situations, these two spaces can have common nodes. For example, if node F was calculating its p space and a q space for node J after the failure, the two spaces would include some of the same nodes. Additionally, all of the nodes on the path from F to J would be in the q space. Accordingly, even while in the explicit post-convergence state, node F could specify a path to node J non-explicitly, since node of the path is outside the p and q spaces.

Figure 4:
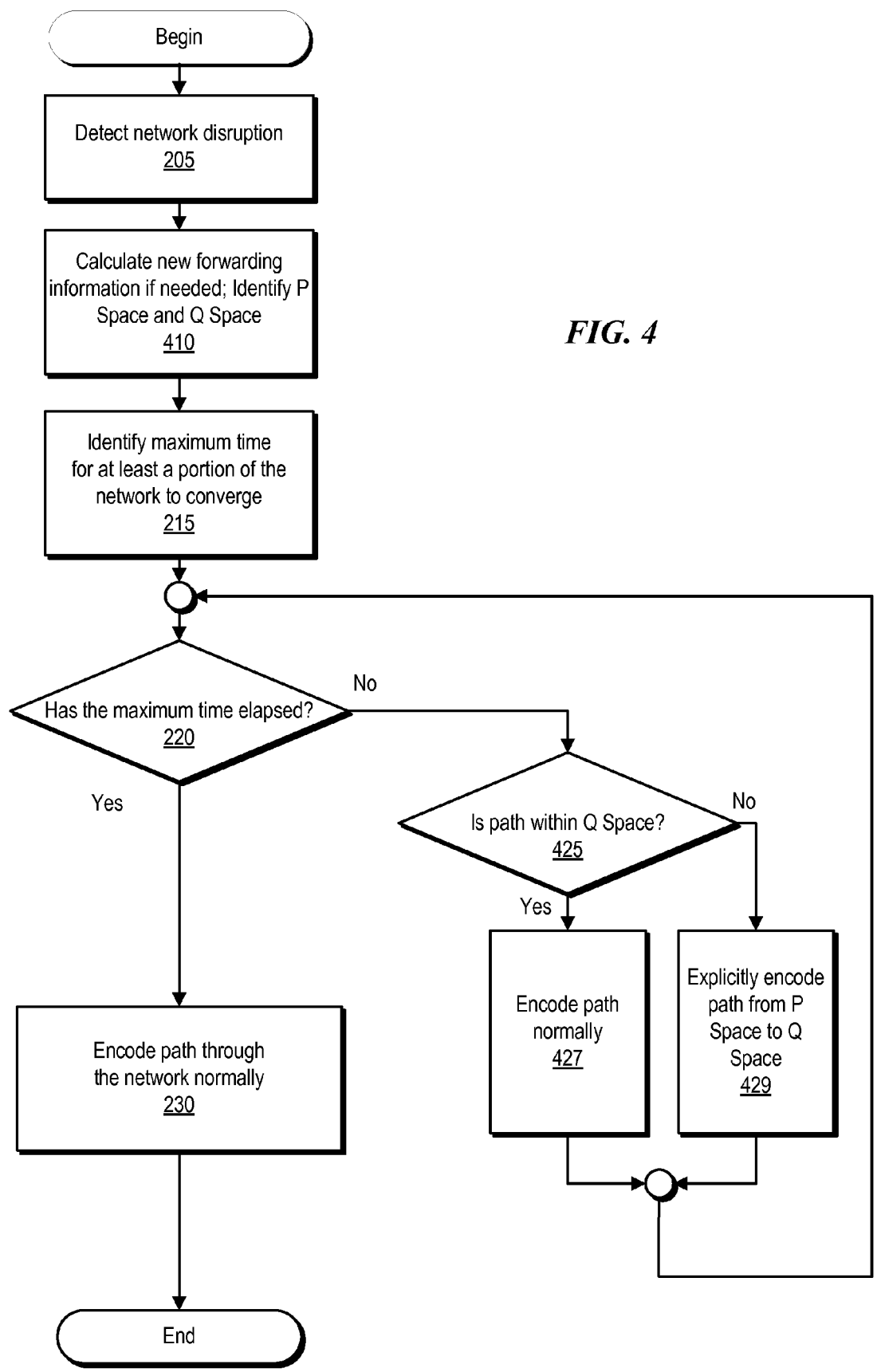
FIG. 4 is a flow chart illustrating another example of a method of reducing loops during network convergence, according to one embodiment.

FIG. 4 is a flowchart illustrating how a node can use p and q spaces to improve path specification while in the explicit post-convergence state. Like the method of FIG. 2, this method can be performed by each node in the network at a somewhat different time. Similar operations to those in FIG. 2 are identified by the same numerals.

The method begins with the detection of a network disruption at 205. Then, in addition to updating its forwarding information, if needed, the node identifies its p space and the q space for any destinations the node needs to communicate with, as shown at 410. Identification of p and q spaces can be done using state information, like a LSDB or OSPF graph, that shows the configuration of the network both before and after the failure.

The node then identifies the maximum time for at least a portion of the network to converge, as shown at 215. If the maximum time has elapsed since the node converged (e.g., by updating its forwarding information at 410), the node can move into the classic post-convergence state and encode paths normally, as shown at 230.

If instead the maximum time has not yet elapsed, the node is still in the explicit post-convergence state. Here, for a given destination, the node determines whether the path to that destination from the node is entirely within the q space, as shown at 425. If so, the node can encode the path normally, as shown at 427, since none of the nodes along the path have been affected in their ability to communicate with the destination by the failure.

If instead not all of the nodes along the path from the node to the destination are in the q space, the node will only need explicitly specify the portion of the path between the p and q spaces, as shown at 429. The node will also need to specify a path from the node to the edge of p space, and from the edge of q space to the destination, but these paths can be specified non-explicitly.

Example Network Devices

Figure 5:
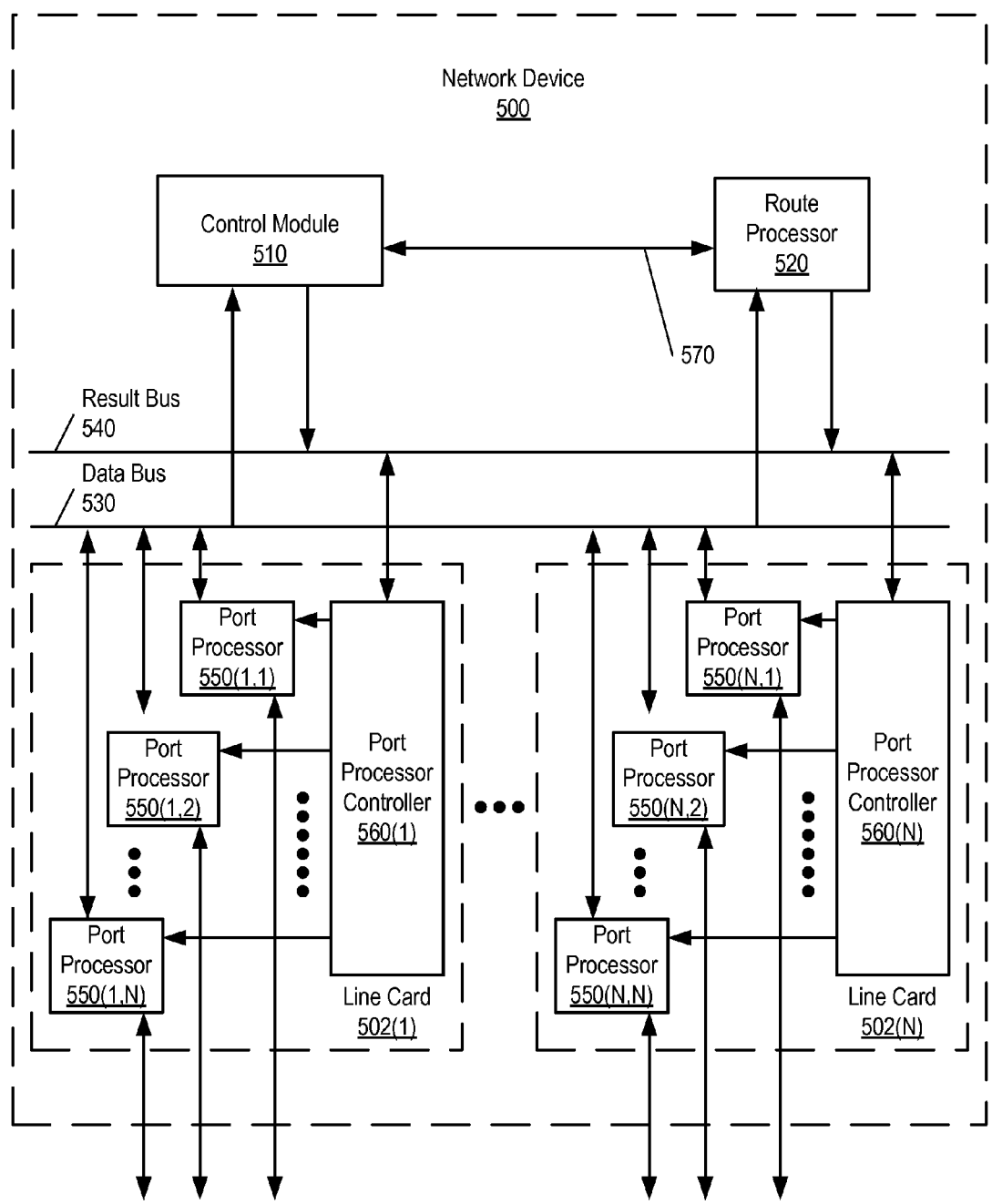
FIG. 5 is a block diagram illustrating certain components of an example node that can be employed in the network of FIG. 1 or 3, according to in one embodiment.

FIG. 5 is a block diagram illustrating certain additional and/or alternative components of nodes that can be employed in the networks shown in FIGS. 1 and 3. In this depiction, node 500 includes a number of line cards (line cards 502(1)-(N)) that are communicatively coupled to a forwarding engine or packet forwarder 510 and a processor 520 via a data bus 530 and a result bus 540. Line cards 502(1)-(N) include a number of port processors 550(1,1)-(N,N) which are controlled by port processor controllers 560(1)-(N). It will also be noted that forwarding engine 510 and processor 520 are not only coupled to one another via data bus 530 and result bus 540, but are also communicatively coupled to one another by a communications link 570.

The processors 550 and 560 of each line card 502 may be mounted on a single printed circuit board. When a packet or packet and header are received, the packet or packet and header may be identified and analyzed by router 500 in the following manner. Upon receipt, a packet (or some or all of its control information) or packet and header is sent from the one of port processors 550(1,1)-(N,N) at which the packet or packet and header was received to one or more of those devices coupled to data bus 530 (e.g., others of port processors 650(1,1)-(N,N), forwarding engine 510 and/or processor 520). Handling of the packet or packet and header can be determined, for example, by forwarding engine 510. For example, forwarding engine 510 may determine that the packet or packet and header should be forwarded to one or more of port processors 550(1,1)-(N,N). This can be accomplished by indicating to corresponding one(s) of port processor controllers 560(1)-(N) that the copy of the packet or packet and header held in the given one(s) of port processors 550(1,1)-(N,N) should be forwarded to the appropriate one of port processors 550(1,1)-(N,N). In addition, or alternatively, once a packet or packet and header has been identified for processing, forwarding engine 510, processor 520 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Figure 6:
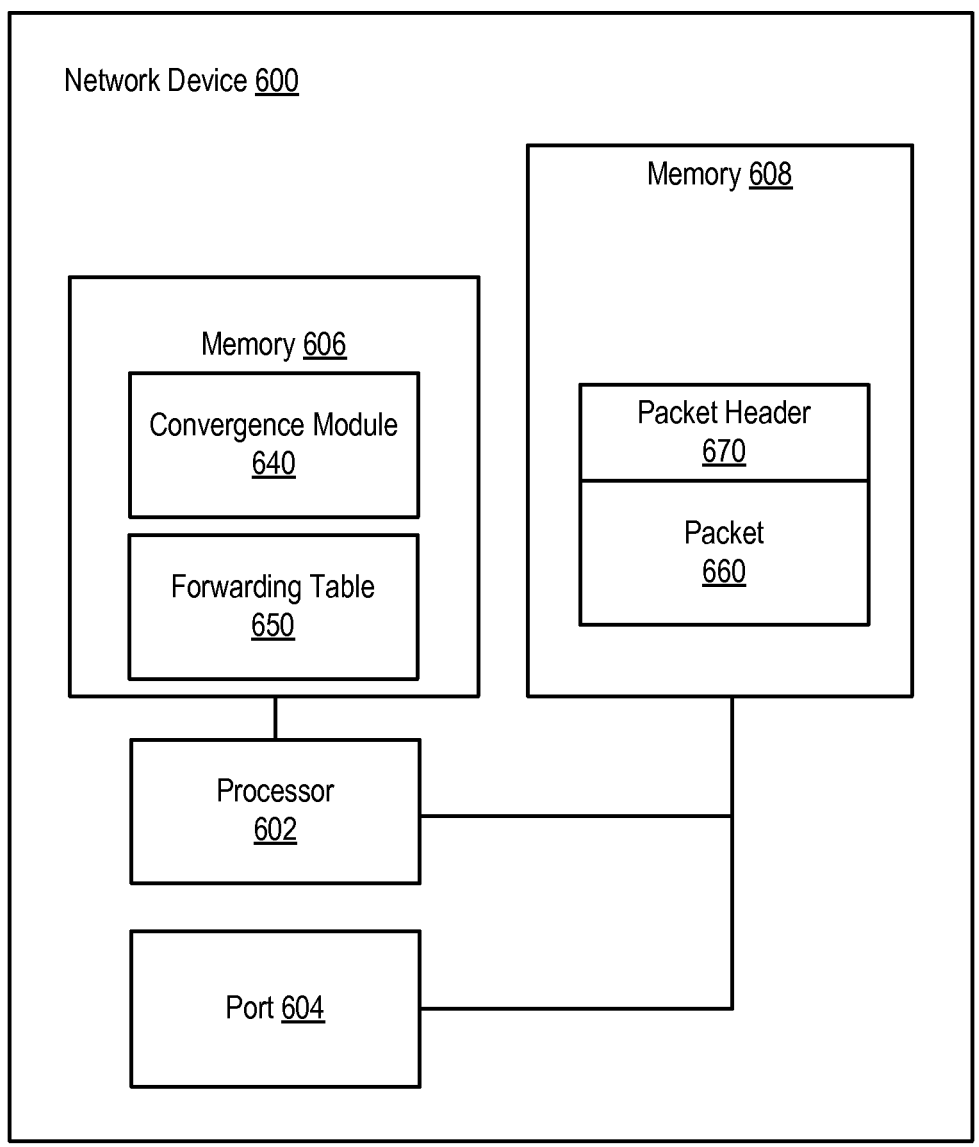
FIG. 6 is a block diagram illustrating how certain components of a network node can be implemented in software in one embodiment.

FIG. 6 is a block diagram of a network device 600 (e.g., one of the network nodes A-E of FIG. 1 or nodes A-J of FIG. 3). As illustrated, network device 600 includes one or more processors 602 (e.g., microprocessors, PLDs (Programmable Logic Devices), or ASICs (Application Specific Integrated Circuits)) configured to execute program instructions stored in memories 606 and/or 608. Memories 606 and 608 can include various types of RAM (Random Access Memory), ROM (Read Only Memory), Flash memory, MEMS (Micro Electro-Mechanical Systems) memory, and the like. Network device 600 also includes one or more ports 604 (e.g., one or more hardware ports or other network interfaces that can be linked to other network devices, hosts, servers, storage devices, or the like). Processor 602, port 604, and memories 606 and 608 are coupled to send and receive data and control signals by one or more buses or other interconnects.

In this example, program instructions executable to implement convergence module 640, which can be configured to perform all or some of the functionality discussed above with respect to FIGS. 2 and 4, are stored in memory 606. Memory 606 can also store all or part of a forwarding table 650, which may store SR information. Memory 608 can also store all or part of a packet 660 and a corresponding packet header 670. The packet header 670 can include information specifying a path through a network from network device 600 to a destination network device. The path can be specified in different manners by convergence module 640 or by a normal forwarding module.

The program instructions and/or data can be stored on various computer readable storage media such as a memory (e.g., RAM (Random Access Memory)). In some embodiments, such software is stored on a computer readable storage medium such as a CD (Compact Disc), DVD (Digital Versatile Disc), hard disk, optical disk, tape device, floppy disk, and the like). In order be executed, the software is loaded into memory from another computer readable storage medium. The instructions and/or data can also be transferred to a computing device for storage in memory via a network such as the Internet or upon a carrier medium. In some embodiments, the instructions and/or data are conveyed using a carrier medium such as a network and/or a wireless link upon which signals such as electrical, electromagnetic, or digital signals.

Although the present disclosure has been made in connection with several embodiments, the disclosure is not intended to be limited to the specific forms set forth herein. On the contrary, it is intended to cover such alternatives, modifications, and equivalents as can be reasonably included within the scope defined by the appended claims.

We claim:

1. A method comprising:
   detecting a topology change within a network in which a segment routing (SR) protocol is implemented, wherein
      the topology change disrupts an existing forwarding path between a first network node and a destination network node;
   calculating new forwarding table information in response to the topology change, wherein
      the new forwarding table information comprises forwarding table information for at least one updated forwarding path from the first network node to the destination network node, and
      the new forwarding table information is generated according to the SR protocol;
   identifying a maximum time for at least a portion of the network to reach a post-convergence state with respect to the topology change;
   until the maximum time has elapsed at the first network node,
      explicitly specifying at least a portion of the at least one updated forwarding path in a packet header of a packet, if the packet is being sent from the first network node to the destination network node; and
   after the maximum time has elapsed at the first network node,
      non-explicitly specifying the at least the portion of the at least one updated forwarding path in a packet header of an additional packet, if the additional packet is being sent from the first network node to the destination network node, wherein
      the detecting, the calculating, the identifying, the explicitly specifying, and the non-explicitly specifying are performed by the first network node.

2. The method of claim 1, further comprising:
detecting the topology change at a second network node within the network, wherein
the first network node calculates the new forwarding information at a first time and performs the explicitly specifying the at least the portion of the at least one updated forwarding path from the first time until the first time plus the maximum time, and
the second network node calculates second new forwarding information at a second time; and
explicitly specifying at least a portion of a second updated forwarding path between the second network node and a second destination network node in a packet header of a packet sent from the second network node to the second destination network node from the second time until the second time plus the maximum time, wherein
the explicitly specifying the at least the portion of the second updated forwarding path is performed by the second network node.

3. The method of claim 1, further comprising:
detecting, after the topology change, that the first network node can communicate with a first set of network nodes without being affected by the topology change, and that a second set of network nodes can communicate with the destination network node without being affected by the topology change, but that the first set of network nodes is not included in the second set of network nodes; and
performing the explicitly specifying by generating a packet header that comprises: a first sub-path identifier that identifies a path from the first network node to an edge of the first set of network nodes; a second sub-path identifier that identifies at least a portion of a path from the edge of the first set of network nodes to an edge of the second set of network nodes; and a third sub-path identifier that identifies a path from the edge of the second set of network nodes to the destination network node, wherein
the detecting and the performing are performed by the first network node.

4. The method of claim 3, wherein the non-explicitly specifying comprises:
generating a packet header that specifies fewer sub-path identifiers than the packet header generated during the explicitly specifying.

5. The method of claim 1, further comprising:
receiving a first packet, sent by the first network node, at a second network node, wherein
the first packet comprises
a first header explicitly specifying the at least the portion of the at least one updated forwarding path, and
the second network node receives the first packet before the second network node reaches a classic post-convergence state in response to the topology change.

6. The method of claim 1, further comprising:
receiving a first packet, sent by the first network node, at a second network node, wherein
the first packet comprises
a first header explicitly specifying the at least the portion of the at least one updated forwarding path, and
the second network node receives the first packet subsequent to the second network node reaching a classic post-convergence state in response to the topology change.

7. The method of claim 1, wherein the explicitly specifying comprises:
explicitly specifying a first N network nodes on the at least one updated forwarding path between the first network node and the destination network node.

8. A non-transitory computer-readable storage medium comprising program instructions executable by a first network node to:
detect a topology change within a network in which a segment routing (SR) protocol is implemented, wherein
the topology change disrupts an existing forwarding path between the first network node and a destination network node;
calculate new forwarding table information in response to the topology change, wherein
the new forwarding table information comprises forwarding table information for at least one updated forwarding path from the first network node to the destination network node, and
the new forwarding table information is generated according to the SR protocol;
identify a maximum time for at least a portion of the network to reach a post-convergence state with respect to the topology change;
until the maximum time has elapsed at the first network node,
explicitly specify at least a portion of the at least one updated forwarding path in a packet header of a packet, if the packet is being sent from the first network node to the destination network node; and
after the maximum time has elapsed at the first network node,
non-explicitly specify the at least the portion of the at least one updated forwarding path in a packet header of an additional packet, if the additional packet is being sent from the first network node to the destination network node.

9. The non-transitory computer-readable storage medium of claim 8, wherein the program instructions are further executable by the first network node to:
calculate the new forwarding information at a first time and execute the program instructions executable by the first network node to explicitly specify the at least the portion of the at least one updated forwarding path from the first time until the first time plus the maximum time, wherein
a second network node is configured to calculate second new forwarding information at a second time, and
the second network node is configured to explicitly specify at least a portion of a second updated forwarding path between the second network node and a second destination network node in a packet header of a packet sent from the second network node to the second destination network node from the second time until the second time plus the maximum time.

10. The non-transitory computer-readable storage medium of claim 8, wherein the program instructions are further executable by the first network node to:
detect, after the topology change, that the first network node can communicate with a first set of network nodes without being affected by the topology change, and that a second set of network nodes can communicate with the destination network node without being affected by the topology change, but that the first set of network nodes is not included in the second set of network nodes; and
execute the program instructions executable by the first network node to explicitly specify by virtue of comprising program instructions executable by the first network node to generate a packet header that comprises a first sub-path identifier that identifies a path from the first network node to an edge of the first set of network nodes, a second sub-path identifier that identifies at least a portion of a path from the edge of the first set of network nodes to an edge of the second set of network nodes, and a third sub-path identifier that identifies a path from the edge of the second set of network nodes to the destination network node.

11. The non-transitory computer-readable storage medium of claim 10, wherein the program instructions executable by the first network node to non-explicitly specify comprise program instructions executable by the first network node to:
generate a packet header that specifies fewer sub-path identifiers than the packet header generated during the non-explicitly specifying.

12. The non-transitory computer-readable storage medium of claim 8, wherein the program instructions executable by the first network node to explicitly specify comprise program instructions executable by the first network node to:
explicitly specify a first N network nodes on the at least one updated forwarding path between the first network node and the destination network node.

13. The non-transitory computer-readable storage medium of claim 8, further comprising program instructions executable by a second network node to:
receive a first packet, sent by the first network node, at the second network node, wherein
the first packet comprises
a first header explicitly specifying the at least the portion of the at least one updated forwarding path.

14. A system comprising:
one or more processors; and
a memory storing program instructions executable by the one or more processors to
detect a topology change within a network in which a segment routing (SR) protocol is implemented, wherein
the topology change disrupts an existing forwarding path between a first network node and a destination network node,
calculate new forwarding table information in response to the topology change, wherein
the new forwarding table information comprises forwarding table information for at least one updated forwarding path from the first network node to the destination network node, and
the new forwarding table information is generated according to the SR protocol,
identify a maximum time for at least a portion of the network to reach a post-convergence state with respect to the topology change,
until the maximum time has elapsed at the first network node,
explicitly specify at least a portion of the at least one updated forwarding path in a packet header of a packet, if the packet is being sent from the first network node to the destination network node, and
after the maximum time has elapsed at the first network node,
non-explicitly specify the at least the portion of the at least one updated forwarding path in a packet header of an additional packet, if the additional packet is being sent from the first network node to the destination network node.

15. The system of claim 14, wherein the program instructions are further executable by the one or more processors to:
calculate the new forwarding information at a first time and execute the program instructions executable by the one or more processors to explicitly specify the at least the portion of the at least one updated forwarding path from the first time until the first time plus the maximum time, wherein
a second network node is configured to calculate second new forwarding information at a second time, and
the second network node is configured to explicitly specify at least a portion of a second updated forwarding path between the second network node and a second destination network node in a packet header of a packet sent from the second network node to the second destination network node from the second time until the second time plus the maximum time.

16. The system of claim 14, wherein the program instructions are further executable by the one or more processors to:
detect, after the topology change, that the first network node can communicate with a first set of network nodes without being affected by the topology change, and that a second set of network nodes can communicate with the destination network node without being affected by the topology change, but that the first set of network nodes is not included in the second set of network nodes; and
execute the program instructions executable by the one or more processors to explicitly specify by virtue of comprising program instructions executable by the one or more processors to generate a packet header that comprises
a first sub-path identifier that identifies a path from the first network node to an edge of the first set of network nodes,
a second sub-path identifier that identifies at least a portion of a path from the edge of the first set of network nodes to an edge of the second set of network nodes, and
a third sub-path identifier that identifies a path from the edge of the second set of network nodes to the destination network node.

17. The system of claim 16, wherein the program instructions executable by the one or more processors to non-explicitly specify comprise program instructions executable by the one or more processors to:
generate a packet header that specifies fewer sub-path identifiers than the packet header generated during the non-explicitly specifying.

18. The system of claim 14, wherein the program instructions executable by the one or more processors to explicitly specify comprise program instructions executable by the one or more processors to:
explicitly specify a first N network nodes on the at least one updated forwarding path between the first network node and the destination network node.

19. The system of claim 14, wherein additional program instructions are executable by the one or more processors of a second network node to:
receive a first packet, sent by the first network node, at the second network node, wherein
the first packet comprises
a first header explicitly specifying the at least the portion of the at least one updated forwarding path, and
the second network node receives the first packet before the second network node reaches a classic post-convergence state in response to the topology change.

20. The system of claim 14, wherein additional program instructions are executable by the one or more processors of a second network node to:
- receive a first packet, sent by the first network node, at the second network node, wherein
  - the first packet comprises
    - a first header explicitly specifying the at least the portion of the at least one updated forwarding path, and
  - the second network node receives the first packet subsequent to the second network node reaching a classic post-convergence state in response to the topology change.

* * * * *